(12) United States Patent
Doser et al.

(10) Patent No.: US 9,854,136 B2
(45) Date of Patent: Dec. 26, 2017

(54) METHODS AND SYSTEMS FOR DISPLAYS WITH CHROMATIC CORRECTION WITH DIFFERING CHROMATIC RANGES

(75) Inventors: Ingo Tobias Doser, Villingen-Schwenningen (DE); Jurgen Stauder, Montreuil sur Ille (FR); Bongsun Lee, La Crescenta, CA (US)

(73) Assignee: THOMSON LICENSING DTV, Issy-les-Moulineaux (FR)

( * ) Notice: Subject to any disclaimer, the term of this patent is extended or adjusted under 35 U.S.C. 154(b) by 1771 days.

(21) Appl. No.: 12/450,637

(22) PCT Filed: Dec. 14, 2007

(86) PCT No.: PCT/FR2007/052525
§ 371 (c)(1),
(2), (4) Date: Apr. 8, 2010

(87) PCT Pub. No.: WO2008/122701
PCT Pub. Date: Oct. 16, 2008

(65) Prior Publication Data
US 2010/0220237 A1    Sep. 2, 2010

Related U.S. Application Data

(60) Provisional application No. 60/921,579, filed on Apr. 3, 2007.

(51) Int. Cl.
*H04N 1/60* (2006.01)
*G09G 5/02* (2006.01)

(52) U.S. Cl.
CPC ............. *H04N 1/6058* (2013.01); *G09G 5/02* (2013.01)

(58) Field of Classification Search
USPC ........................................................ 348/649
See application file for complete search history.

(56) References Cited

U.S. PATENT DOCUMENTS 5,212,546 A   5/1993 Arazi et al.
5,333,069 A   7/1994 Spence
(Continued)

FOREIGN PATENT DOCUMENTS

CN   1934851    3/2007
DE   4310727    10/1993
(Continued)

OTHER PUBLICATIONS

HDMI 1.3a Specification, Nov. 10, 2006.*
(Continued)

*Primary Examiner* — Michael Teitelbaum
(74) *Attorney, Agent, or Firm* — Tutunjian & Bitetto, P.C.

(57) ABSTRACT

There are provided a method and system for color correcting displays with different color gamuts. The method includes performing color correction on source picture content, using at least one of a non-reference type display having a non-reference color gamut and a reference type display having a reference color gamut. The performing step includes mastering the source picture content to provide mastered color corrected picture content for display on the reference type displays having a reference color gamut. The performing step further includes generating metadata for a subsequent inverse color gamut mapping that color transforms the mastered color corrected picture content for display on non-reference type displays having a non-reference color gamut. The subsequent inverse color gamut mapping is an inverse operation of a color gamut mapping applied during the color correction to obtain the mastered color corrected picture content for display on the reference type displays having the reference color gamut. The source picture content is mastered only for the reference type displays having the reference color gamut.

13 Claims, 8 Drawing Sheets

(56) References Cited

U.S. PATENT DOCUMENTS

| | | |
|---|---|---|
| 5,502,458 A | 3/1996 | Braudaway et al. |
| 5,668,890 A | 9/1997 | Winkelman |
| 5,754,184 A | 5/1998 | Spaulding et al. |
| 6,268,939 B1 | 7/2001 | Klassen et al. |
| 6,282,312 B1 | 8/2001 | McCarthy et al. |
| 6,560,358 B1 | 5/2003 | Tsukada |
| 6,754,384 B1 | 6/2004 | Spaulding et al. |
| 6,771,323 B1 | 8/2004 | Dean et al. |
| 6,775,407 B1 | 8/2004 | Gindele et al. |
| 6,822,760 B1 | 11/2004 | Spaulding et al. |
| 6,897,876 B2 | 5/2005 | Murdoch et al. |
| 6,947,589 B2 | 9/2005 | Newman et al. |
| 7,403,304 B2 | 7/2008 | Andreas et al. |
| 8,149,338 B2 | 4/2012 | Rehm et al. |
| 2002/0120781 A1 | 8/2002 | Hirashima et al. |
| 2003/0053683 A1 | 3/2003 | Newman et al. |
| 2004/0105581 A1 | 6/2004 | Sawada |
| 2004/0263528 A1 | 12/2004 | Murdoch et al. |
| 2005/0089189 A1 | 4/2005 | Langelaar |
| 2005/0147295 A1 | 7/2005 | Kim et al. |
| 2005/0152597 A1 | 7/2005 | Spaulding et al. |
| 2005/0152612 A1 | 7/2005 | Spaulding et al. |
| 2006/0096483 A1 | 5/2006 | Andreas et al. |
| 2006/0103861 A1 | 5/2006 | Klassen et al. |
| 2007/0121132 A1 | 5/2007 | Blinn et al. |
| 2007/0211074 A1 | 9/2007 | Yeung |
| 2007/0291179 A1 | 12/2007 | Sterling et al. |
| 2009/0080769 A1 | 3/2009 | Kagawa et al. |
| 2009/0102968 A1 | 4/2009 | Doser et al. |
| 2009/0109344 A1 | 4/2009 | Ollivier et al. |
| 2009/0174726 A1 | 7/2009 | Ollivier |
| 2009/0201309 A1 | 8/2009 | Demos |
| 2009/0238456 A1 | 9/2009 | Fukasawa |
| 2009/0284554 A1 | 11/2009 | Doser |
| 2010/0128976 A1 | 5/2010 | Stauder et al. |
| 2010/0134529 A1 | 6/2010 | Doser et al. |
| 2010/0135419 A1 | 6/2010 | Doser et al. |
| 2010/0157154 A1 | 6/2010 | Kobayashi et al. |
| 2010/0220237 A1 | 9/2010 | Doser et al. |
| 2010/0265264 A1 | 10/2010 | Doser et al. |
| 2010/0289810 A1 | 11/2010 | Doser et al. |
| 2011/0154426 A1 | 6/2011 | Doser et al. |

FOREIGN PATENT DOCUMENTS

| | | |
|---|---|---|
| DE | 10023270 | 5/2002 |
| DE | 10243554 | 4/2004 |
| EP | 1578140 | 9/2005 |
| JP | 06208360 | 7/1994 |
| JP | 07135635 | 5/1995 |
| JP | 08037604 | 2/1996 |
| JP | 09270925 | 10/1997 |
| JP | 11017868 | 1/1999 |
| JP | 2002116750 | 4/2002 |
| JP | 2002218262 | 8/2002 |
| JP | 2003169220 | 6/2003 |
| JP | 2003241732 | 8/2003 |
| JP | 2004282599 | 10/2004 |
| JP | 2005176361 | 6/2005 |
| WO | WO2005094059 | 10/2005 |
| WO | WO2006050305 | 5/2006 |

OTHER PUBLICATIONS

International Search Report, dated Aug. 22, 2008.
Office Action for U.S. Appl. No. 12/450,621 dated Feb. 27, 2013.
Office Action for U.S. Appl. No. 12/450,621 dated Sep. 26, 2013.
Office Action for U.S. Appl. No. 12/450,621 dated Dec. 13, 2013.
Notice of Allowance for U.S. Appl. No. 12/450,621 dated Jun. 20, 2014.
Office Action for U.S. Appl. No. 12/450,622 dated Feb. 20, 2013, Aug. 28, 2013.
Notice of Allowance issued for U.S. Appl. No. 12/450,622 dated Aug. 18, 2014.
Office Action for U.S. Appl. No. 12/450,622 dated Dec. 30, 2013.
Notice of Allowance for U.S. Appl. No. 12/450,621 dated May 6, 2016.
Office Action for U.S. Appl. No. 12/450,622 dated Feb. 20, 2013.
Office Action for U.S. Appl. No. 12/450,622 dated Aug. 28, 2013.
International Search Report for Corresponding International Application No. PCT/FR2007/052528 dated Aug. 27, 2008.
International Search Report for Corresponding International Application No. PCT/FR2007/052523 dated Aug. 27, 2008.

* cited by examiner

METHODS AND SYSTEMS FOR DISPLAYS WITH CHROMATIC CORRECTION WITH DIFFERING CHROMATIC RANGES

This application claims the benefit, under 35 U.S.C. § 365 of International Application PCT/FR2007/052525, filed Dec. 14, 2007, which was published in accordance with PCT Article 21(2) on Oct. 16, 2008 in French and which claims the benefit of U.S. provisional patent application No. 60/921,579, filed Apr. 3, 2007.

The present principles relate generally to television displays and, more particularly, to a method and system for color correcting to provide predictable results on displays with different color gamuts.

In today's motion picture industry, colors of motion picture content are mostly graded for displays with a single color gamut defined by cathode ray tube (CRT) phosphor colors, corresponding to either the European Broadcasting Union (EBU) or the Society of Motion Picture and Television Engineers color standard (SMPTE-C) for Standard Definition, and the International Telecommunication Union (ITU) 709 colors for High Definition. These are the current standards for use in determining the reference color gamut (RCG) for displays. However, displays with non-standard color gamuts are currently prevalent among consumers of motion picture content.

When editing the colors of a picture on a display with a reference color gamut other than the color gamut of the target display, the resultant colors may look dissatisfying on the target display. To illustrate cases where the resultant colors may look dissatisfying, the following two cases are described.

The first case relates to consumer displays having color gamuts roughly the same size as the reference display, but the display primaries are not equal to the display primaries of the reference display during content creation. In such circumstances, it is desirable to ensure that the colors can be accurately represented on the consumer displays.

The second case relates to the current existence of wide gamut color displays being utilized in the field. In such circumstances, no methods exist to color correct consumer displays with respect to these wide gamut color displays. For example, such consumer displays may use a different reference color gamut but may or may not be capable of even displaying colors in accordance with the wide gamut color standards.

There is an analogy to the situation when color television was initially introduced in the United States. A lot of different sets of primaries were being utilized at that time that would not allow for a unified colorimetric. However, the stockpiling by one of the primary television manufacturers of a significant amount of phosphors produced by a particular phosphor manufacturer resulted in the effective formation of a quasi standard and, then, ultimately a standard (SMPTE-C). However, the Federal Communications Commission (FCC) never adopted this and the television manufacturing industry had to live with this dichotomy. There were attempts by the Society of Motion Picture and Television Engineers (SMPTE) to emulate National Television System Committee (NTSC) colors on a SMPTE-C monitor which eventually failed due to technology reasons at that time.

The color gamut of a display is determined by the display technology chosen. At this moment, a consumer has the choice between the following technologies (also referred to herein as "display type") including, for example, liquid crystal display (LCD), Plasma, cathode ray tube (CRT), digital light processing (DLP), and silicon crystal reflective display (SXRD). However, there can be significant differences between different display technologies, as well as between two representatives of the same display technology. For example, two liquid crystal display sets can be equipped with different sets of light sources. One of these sets of light sources may be cold cathode fluorescent lights (CCFL), where the color gamut mainly depends on the phosphors used. Historically, these light sources did not permit the use of a high color gamut. In fact, displays that used these light sources could not reproduce all 709 colors, as per the International Telecommunication Union (ITU) 709 color standard for high definition. However, recent developments have brought products to market that use so-called wide gamut cold cathode fluorescent lights (W-CCFL), where the color gamut is even larger than the 709 color gamut. Another component of liquid crystal display technology is the color filters, which could be designed to have a high light output and, thus, a high light efficiency with a narrow color gamut, or could be designed to have a luminous light efficiency and a wider color gamut. Another trend is that LCD display's CCFL back light units (BLU's) get replaced by RGB LED (Light Emitting Diodes) BLU's with an even higher color gamut.

Digital light processing displays and silicon crystal reflective displays (including rear projection) displays are reflective displays that filter light coming from a light source. Currently, there are different techniques to increase the color gamut of those devices. In fact, as of today, some of the displays employing these different techniques already have an increased color gamut compared to the current applicable reference color gamut.

With the advent of wide gamut displays, it has become possible to display a wider range of colors than was previously possible. The current video content on digital video disks (DVD's), television broadcasts, and/or via video over Internet Protocol (VoIP), are encoded in a color space with a reference color gamut and, thus, follow the rules that were set many years ago when wide gamut color display was not feasible. In fact, until recently it was difficult to achieve a reproduction even of the current reference color gamut.

As it looks today, the situation has changed. An extended color gamut is feasible and there is a desire to utilize the wider color gamut. However, instead of choosing another set of wide color gamut primaries, the current trend that seems to be preferred is the use of open, unrestrictive color standards. One example of such standard is XYZ for Digital Cinema, or xvYCC (IEC 61966-2-3) for consumer television. Other examples include, for example, sYCC (International Electrotechnical Commission (IEC) 61966-2-1), ITU-R BT.1361, or e-sRGB (Photographic and Imaging Manufacturers Association (PIMA) 7667) for computer graphics and still picture photography.

At the same time, there is significant variation in the color gamuts used in various displays currently available. Until recently, the color gamut was determined more or less by the standard cathode ray tube phosphors. Today, the range of colors capable of being displayed depends on the display technology used and the hardware design, as described above. Turning to FIG. 1, color gamut measurements of currently available displays are indicated generally by the reference numeral 100. As is evident, there currently exists a significant amount of differences between the current available color gamut measurements 100. It is to be noted that none of the color gamuts of the various available displays are equal to the reference color gamy of the source material which, in this example, corresponds to ITU-R Bt.

709. With respect to FIG. 1, the display with the widest color gamut was a liquid crystal on silicon (LCOS) display under test, with a yellowish Green, and a liquid crystal display (LCD) with a wide gamut backlight with a cyanic Green.

Additionally, current displays seem to simply replace the reference color primaries specified by the applicable standard by the color primaries corresponding to the respective display (e.g., respective display type, respective color gamut implemented on that display, and so forth), similar to the past and the use of different cathode ray tube phosphors. As a consequence, colors do not appear as they should. That is, colors appear different than what they were intended to appear like. For instance, fir trees look like pine trees, tomatoes look like oranges, and so forth. However, mapping primaries is the most primitive and cheapest way of gamut mapping.

In the case of wide gamut material on a wide gamut display, there still is a problem where colors may be displayed incorrectly due to the color gamut of the wide gamut material being different than the color gamut of the wide gamut display. In fact, by using the above mentioned unrestrictive color standards like xvYCC or XYZ, it is always possible that a color gets transmitted that cannot be displayed on one or more particular wide gamut displays.

One method for color correction involves 3×3 matrixing the source primaries to the display primaries (which, however, requires a prior video signal linearization). This solution has problems when colors are transmitted that are beyond the color gamut of the display color gamut. As an example, consider a display with three primaries of Red, Green, and Blue, where the color to be displayed may be a Green color (e.g., a variation of the primary color Green), and that color may be out of the display range. The typical result of such a situation is that the color to be displayed may get clipped to their respective maximum ranges. The problem will manifest in a wrong color reproduction, in a hue, saturation, and also brightness error. The detrimental affect will be even worse if the color appears in a gradation (e.g., as seen most often in animated movies), as a false contour will also appear. A false contour is the appearance of an erroneous structure or object in the picture as a result of artifacts in the video signal processing or in the display.

Consider another example, as follows. A "cyanish" white color is defined as follows: Blue=Max; Red=0.8*Max; and Green=Max; on a wide gamut display, where "max" represents the maximum permissible value. On a narrow gamut display that has less saturated Blue, this will result in a clipping of Blue, and the White will become Greenish. This problem is illustrated in FIG. 3. Turning to FIG. 3, a hue change on a bluish white graduation due to color gamut restriction is indicated generally by the reference numeral 300. In particular, the desired result is shown on the left portion of FIG. 3 and is designated by the reference numeral 310, while the actual result is shown on the right portion of FIG. 3 and is designated by the reference numeral 350. As indicated by the reference numeral 380 and the corresponding text, White turns Yellow due to clipping in Blue.

It is therefore essential that a proper way of color gamut mapping is used for rendering colors on the display used. Turning to FIG. 2, an example color gamut mapping is indicated generally by the reference numeral 200. FIG. 2 shows a "Color Gamut 1" and a "Color Gamut 2" as a cross section, where "Color Gamut 1" is mapped into "Color Gamut 2" by means of color gamut mapping. In the color gamut mapping 100, variation in luminance is shown with respect to the vertical axis (typically denoted as the Y axis), and variance in chrominance is shown with respect to the horizontal axis (typically denoted as the X axis). The provided example is for a "Color Gamut 2" smaller than "Color Gamut 1". However, it is to be appreciated that the opposite case is also possible, where "Color Gamut 2" is larger than "Color Gamut 1".

Turning to FIG. 4, an exemplary high-level diagram showing the workflow for color correction using a display having a reference color gamut for content that may be subsequently displayed on a display with a different color gamut than the reference color gamut is indicated generally by the reference numeral 400.

The undesirable result of the color correction workflow 400 of FIG. 4 is that when color correcting on a display with a reference color display (RCG), the colors on a display with a second color gamut or color gamut 2(CG2) will be reproduced incorrectly.

The color correction workflow 400 involves a content creation side 480 and a content consumer side 490. A RCG display 482 is used on the content creation side 480. A RCG display 492 and a CG2 display 494 are used on the content consumer side 590.

The picture source content may be stored, for example, in a picture source content store 420. The color corrected picture content may be stored, for example, in a color corrected picture content store 440.

A color correction module 430 generates the content that only looks correct on a display of the same type and with the same color gamut. Thus, the colors on the CG2 display will not look the same as the colors that were color corrected on the RCG display. It is very likely that at least some of the colors on the RCG2 display will be clipped and at least some with be displayed with the wrong hue.

The problem is illustrated in FIG. 4 using the "Ski Image", which is part of the CIE TC8-03 test images in their "Guidelines for the Evaluation of Gamut Mapping Algorithms". It is courtesy of Fujifilm Electronic Imaging Ltd. (UK). As we can see, on the content consumer side, the picture can only be retrieved correctly on a display with RCG. The picture will look incorrect and it will show the above mentioned artifacts if a display with a color gamut not equal to the RCG (CG2) is used for display.

These and other drawbacks and disadvantages of the prior art are addressed by the present principles, which are directed to a method and system for color correcting to provide predictable results on displays with different color gamuts.

According to an aspect of the present principles, there is provided a method for color correcting. The method includes performing color correction on source picture content, using at least one of a non-reference type display having a non-reference color gamut and a reference type display having a reference color gamut. The performing step includes mastering the source picture content to provide mastered color corrected picture content for display on the reference type displays having a reference color gamut. The performing step further includes generating metadata for a subsequent inverse color gamut mapping that color transforms the mastered color corrected picture content for display on non-reference type displays having a non-reference color gamut. The subsequent inverse color gamut mapping is an inverse operation of a color gamut mapping applied during the color correction to obtain the mastered color corrected picture content for display on the reference type displays having the reference color gamut. The source picture content is mastered only for the reference type displays having the reference color gamut.

According to another aspect of the present principles, there is provided a system for color correcting. The system includes a color correction module for performing color correction on source picture content, using at least one of a non-reference type display having a non-reference color gamut and a reference type display having a reference color gamut, to provide mastered color corrected picture content for display on the reference type displays having a reference color gamut. The system further includes a color gamut mapping module for performing a color gamut mapping with respect to the mastered color corrected picture content for display on the reference type displays having the reference color gamut to generate metadata for a subsequent inverse color gamut mapping with respect to the color gamut mapping. The subsequent inverse color gamut mapping color transforms the mastered color corrected picture content for display on non-reference type displays having a non-reference color gamut. The source picture content is mastered only for the reference type displays having the reference color gamut.

These and other aspects, features and advantages of the present principles will become apparent from the following detailed description of exemplary embodiments, which is to be read in connection with the accompanying drawings.

The present principles may be better understood in accordance with the following exemplary figures, in which.

Figure 7:
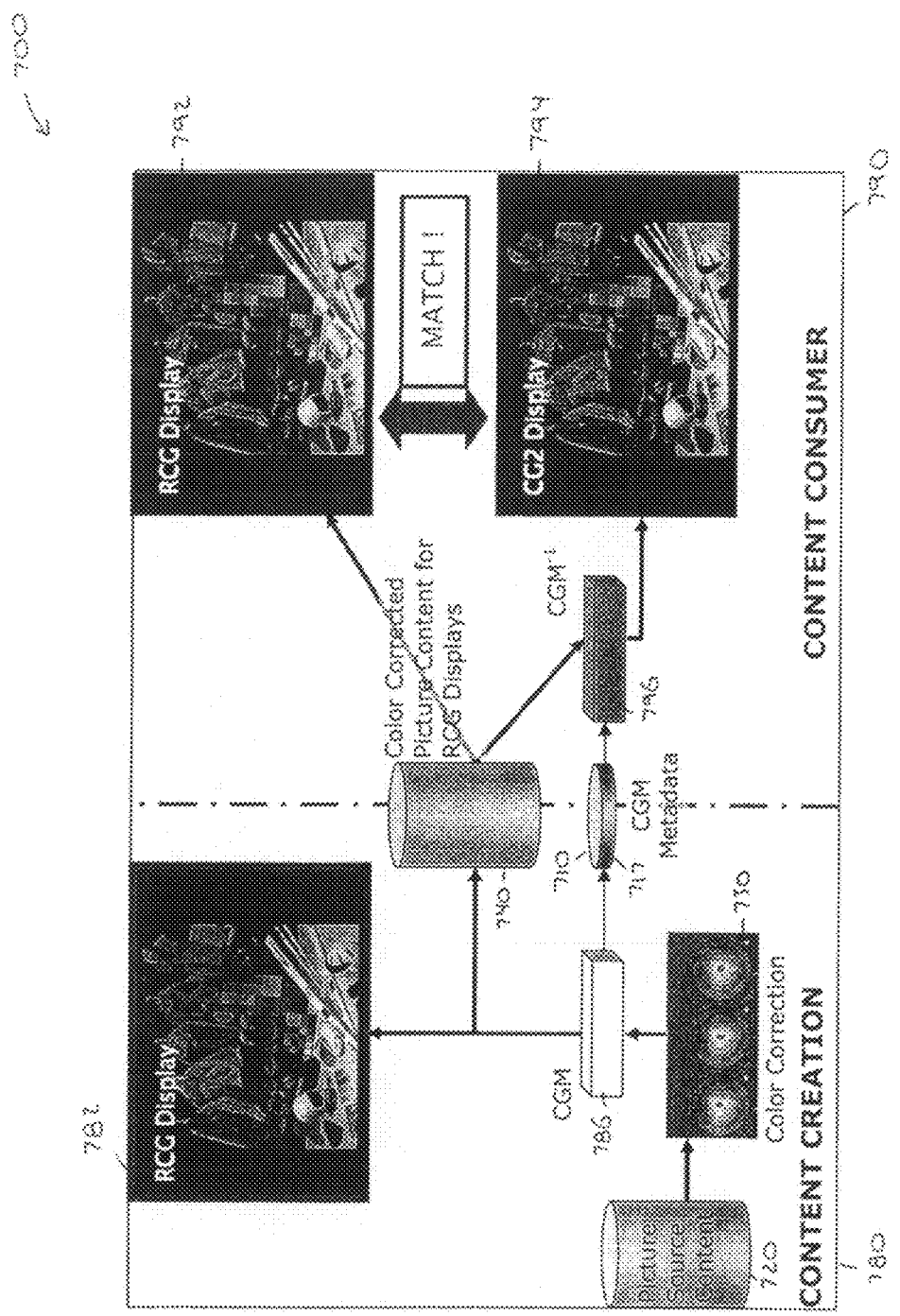
Figure 8:
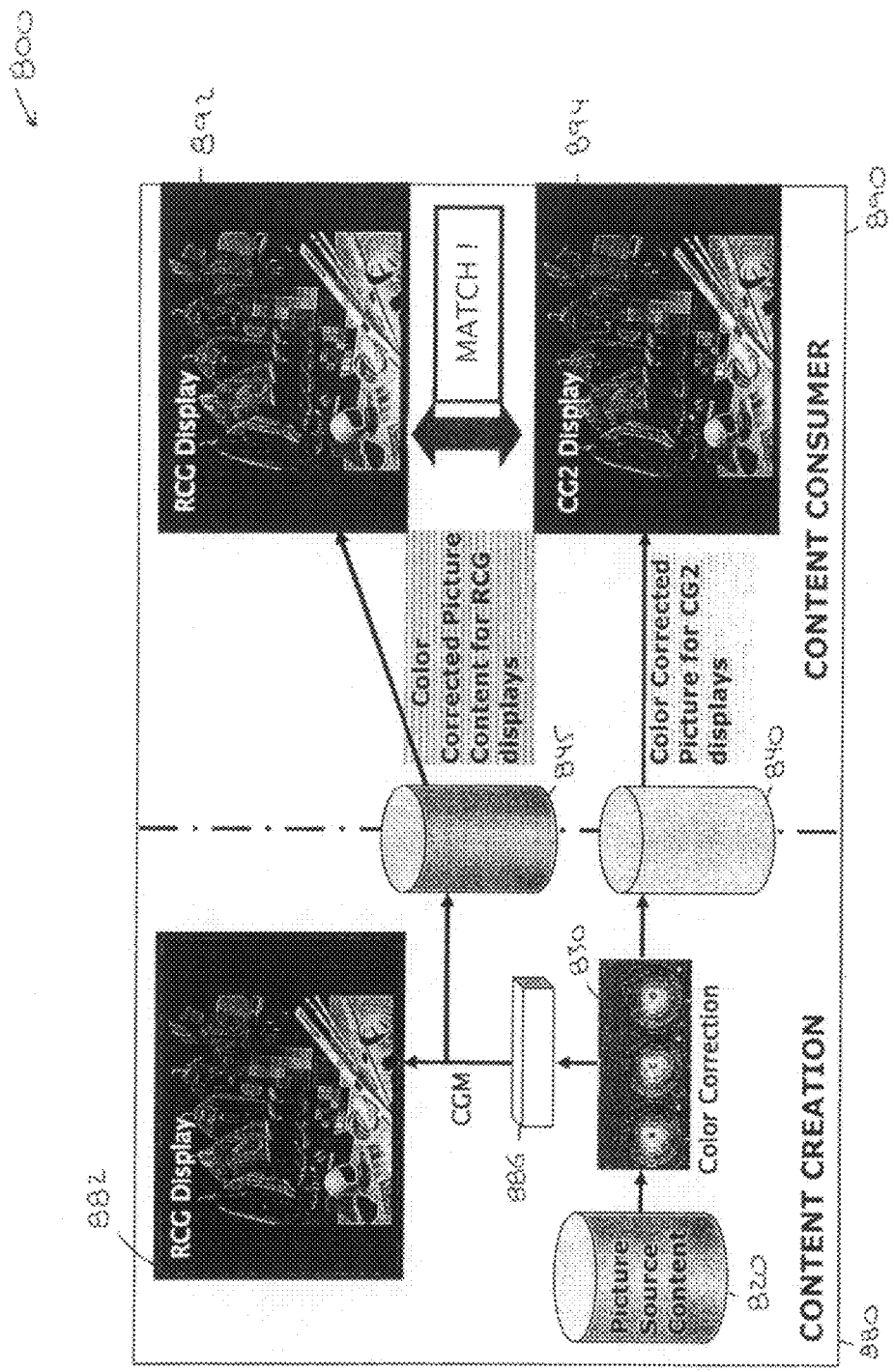

FIG. 7 is a high-level diagram showing another exemplary workflow for color correction to obtain a master for RCG displays and metadata for CG2 displays, in accordance with an embodiment of the present principles; and FIG. 8 is a high-level diagram showing another exemplary workflow for color correction to obtain a master for CG2 displays and one master for RCG displays, in accordance with an embodiment of the present principles.

The present principles are directed to a method and system for color correcting to provide predictable results on displays with different color gamuts.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles means that a particular feature, structure, characteristic, and so forth described in connection with the embodiment is included in at least one embodiment of the present principles. Thus, the appearances of the phrase "in one embodiment" or "in an embodiment" appearing in various places throughout the specification are not necessarily all referring to the same embodiment.

As used herein, the acronym "CG" denotes "color gamut", the acronym "CGM" denotes "color gamut mapping", the acronym "RCG" denotes "reference color gamut", and the acronym "CG2" denotes "color gamut 2".

Also, as used herein, the phrase "RCG displays" refers to displays having a gamut type denoted as a reference color gamut (RCG), while the phrase "CG2 displays" refers to displays having a gamut type denoted as a second color gamut, the second color gamut being different than the reference color gamut.

It is to be appreciated that while the disclosure provided herein is substantially described with respect to, for example, a picture version for RCG displays, and a picture version for CG2 displays, or metadata for reconstructing the picture for CG2 displays, given the variety of available consumer displays, more than one CG2 version may be generated, while maintaining the spirit of the present principles.

Moreover, as used herein, the phrase "709 color gamut" and variations thereof denote 709 colors which, in turn, denote, the color cube defined by the three phosphor primaries and the white point defined in ITU-R Bt.709.

Also, as used herein, with respect to the transmission and receipt of metadata, the phrase "in-band" refers to the transmitting and/or receiving of such metadata together with the color corrected picture content to be displayed by a consumer device. In contrast, the phrase "out-of-band" refers to the transmitting and/or receiving of the metadata separately with respect to the color corrected picture content to be displayed by a consumer device.

Further, as used herein, the phrases "color correction" and "color grading" interchangeably refer to the creative process during post production to tune colors so that the picture expresses the creative intent.

Additionally, as used herein, the phrase "master" refers to mastered display content, where the display content is mastered for a particular color gamut such as, for example, RCG or CG2.

Also, as used herein, the term "metadata" refers to data such as, for example, integer, non-integer values, and/or Boolean values, used to control, turn on or turn off color processing mechanisms, and to modify the functionality of such. Furthermore, metadata may include a specification of a mapping table.

For example, in an embodiment, a color mapping table could be realized by means of a 3-D LUT (three-dimensional Look Up Table). This LUT is used to receive three input values, each value representing one color component, Red, Green, or Blue, and producing a predefined triplet of output values, e.g., Red, Green, and Blue, for each individual Red, Green, and Blue input triplet. In this case, the metadata from content creation to consumer would then include a LUT specification.

Another embodiment may involve the specification of a mapping function such as, for example, circuitry and/or so forth for performing a "GOG" (Gain, Offset, Gamma), which is defined as follows:

$$V\text{out} = \text{Gain}*(\text{Offset}+V\text{in})^{\hat{}}\text{Gamma, for each color component.}$$

In this case, the metadata would include 9 values, one set of Gain, Offset, and Gamma for each of the three color components.

Of course, the present principles are not limited to the preceding embodiments and, given the teachings of the present principles provided herein, other embodiments involving other implementations of metadata are readily contemplated by one of ordinary skill in this and related arts, while maintaining the spirit of the present principles.

Moreover, as used herein, the phrase "color correction" refers to a creative procedure to manually choose the right (preferred) colors on the content creation side (versus the consumer consumption side). Accordingly, the phrase "color correction module" and similar phrases refer to the structure required for a colorist to manually correct such colors. Thus, such structure may involve an interface presented to the colorist such as a graphical user interface (GUI), selection means for allowing the colorist to make selections regarding, for example, colors to be replaced and/or modified, and implementing means for implementing the selections made by the colorist. The selection means may include one or more of the following: a keyboard; a keypad; a mouse; buttons; switches; and so forth.

As noted above, the present principles are directed to a method and system for color correcting to provide predictable results on displays with different color gamuts. The present principles correct differences in colors between different target displays. It is to be appreciated that the present principles are directed to current content (e.g., encoding types and technologies) and displays (e.g., display types, and differences between the same, as well as different display types, resulting from, for example, hardware, software, and so forth) as well as future content and displays, as they relate to the use of different color gamuts.

In an embodiment, the present principles may be used to address an exemplary problem where color correction is to be performed on a display with a reference color gamut, however, the corrected colors are to be displayed on a display with a different color gamut than the reference color gamut used for color correction.

Figure 1:
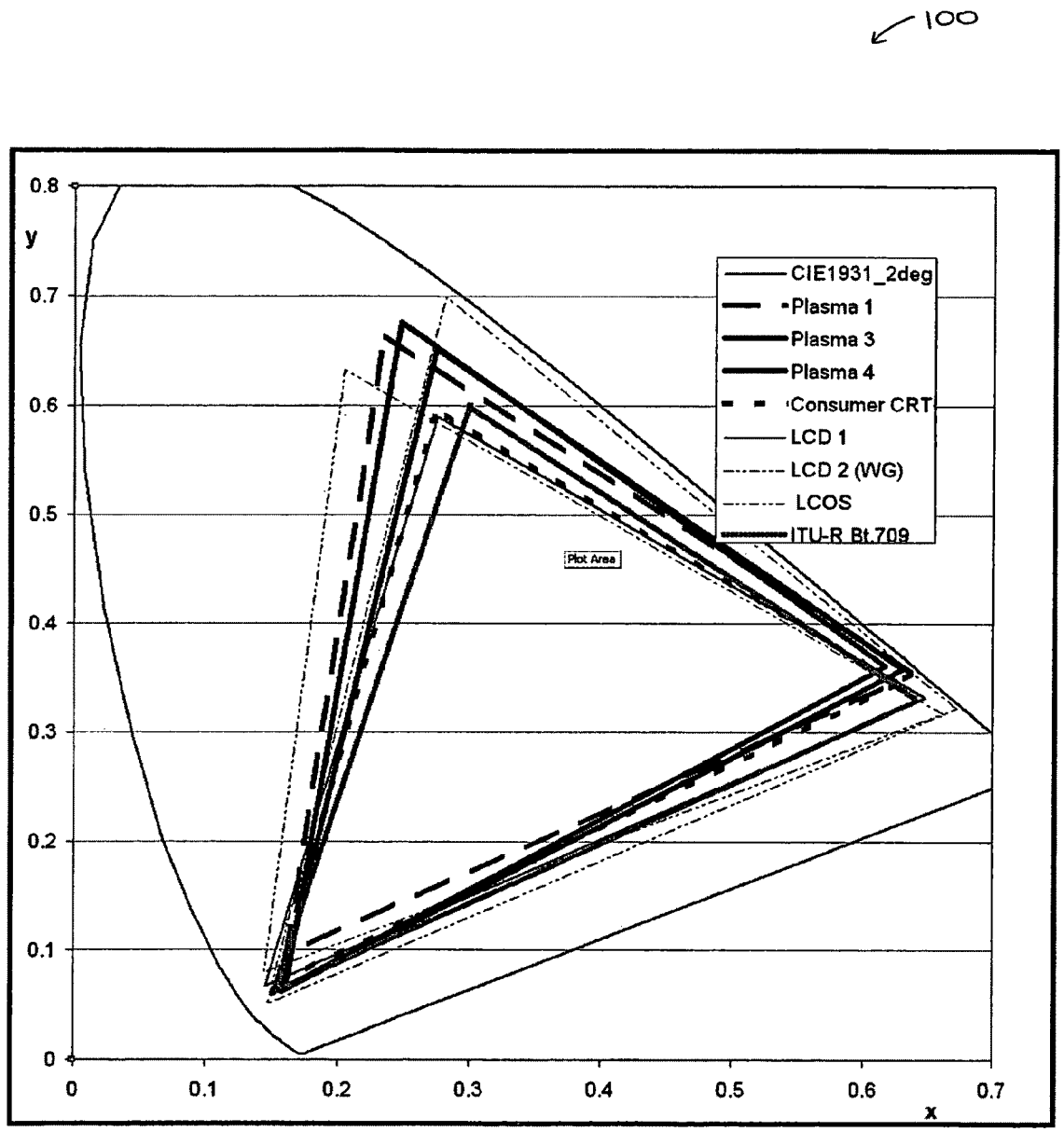
FIG. 1 is a diagram showing color gamut measurements of currently available displays, in accordance with the prior art.
Figure 2:
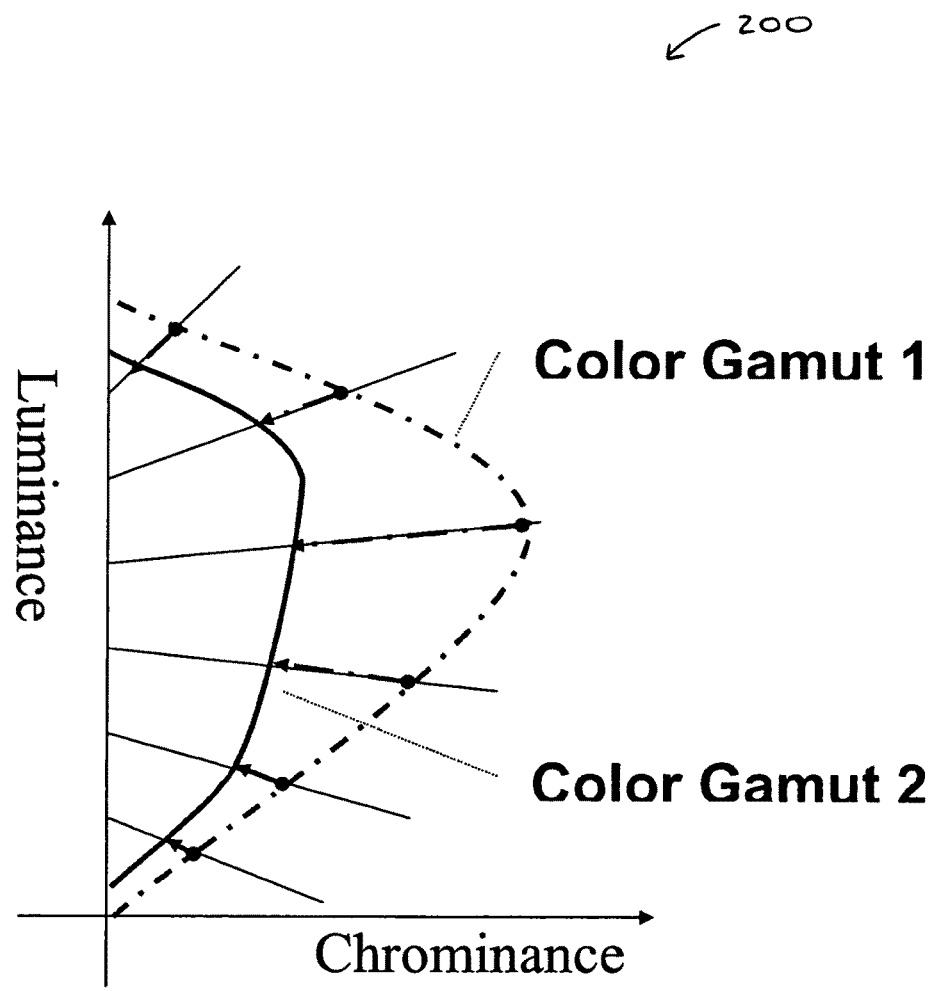
FIG. 2 is a diagram showing an example color gamut mapping, in accordance with the prior art.
Figure 3:
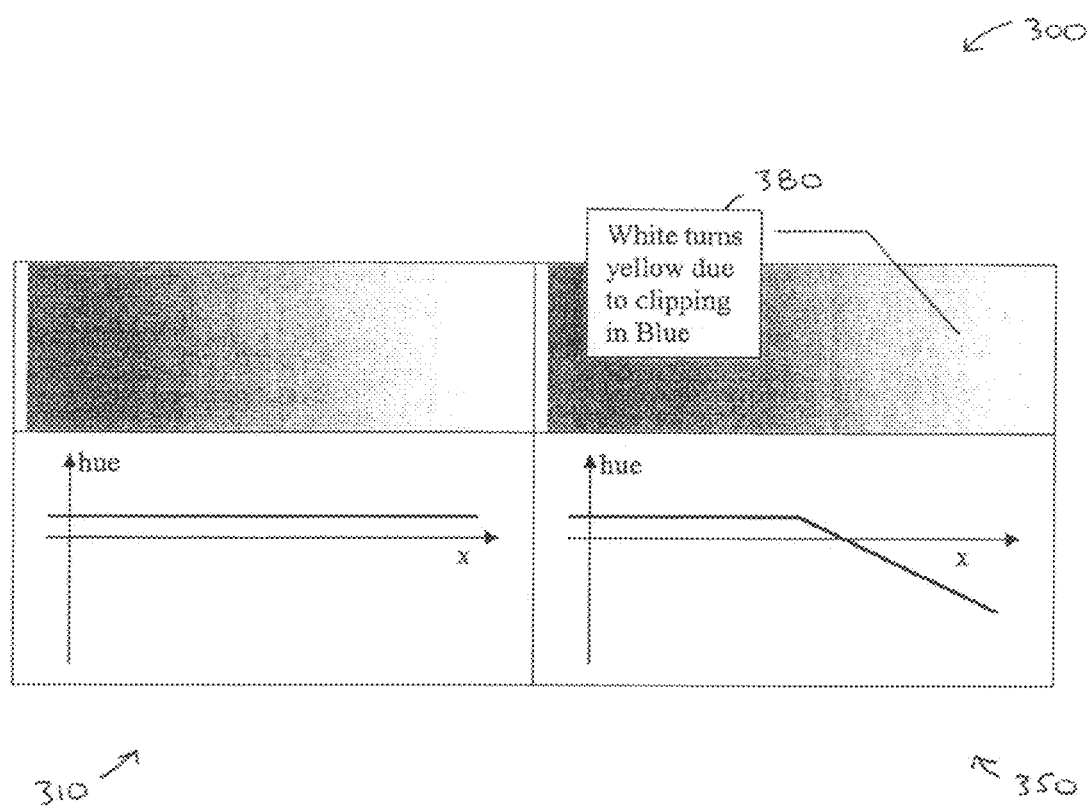
FIG. 3 is a diagram showing a hue change on a bluish white graduation due to color gamut restriction, in accordance with the prior art.
Figure 4:
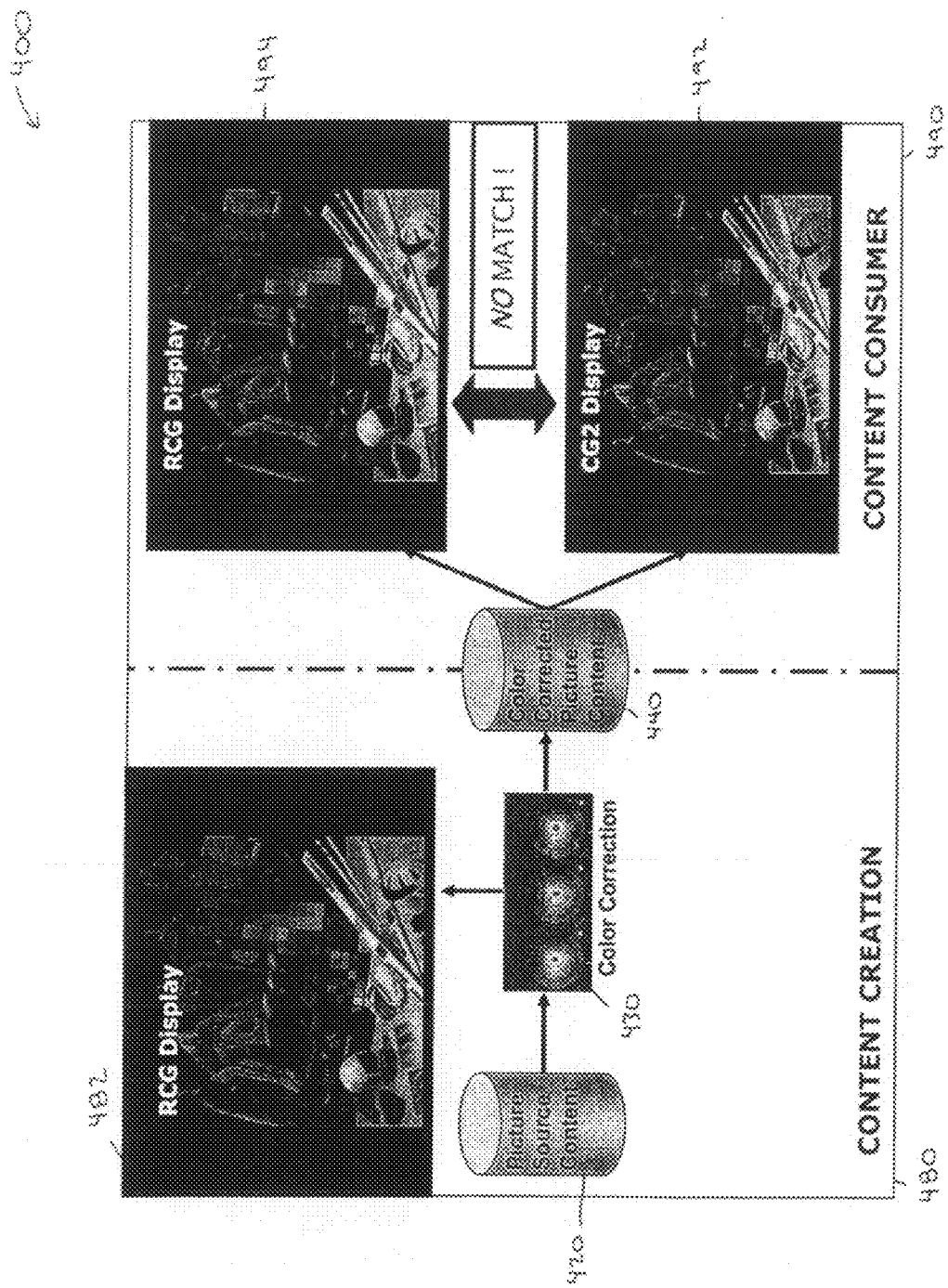
FIG. 4 is a high-level diagram showing the exemplary workflow for color correction using a display having a reference color gamut for content that may be subsequently displayed on a display with a different color gamut than the reference color gamut, in accordance with the prior art.
Figure 5:
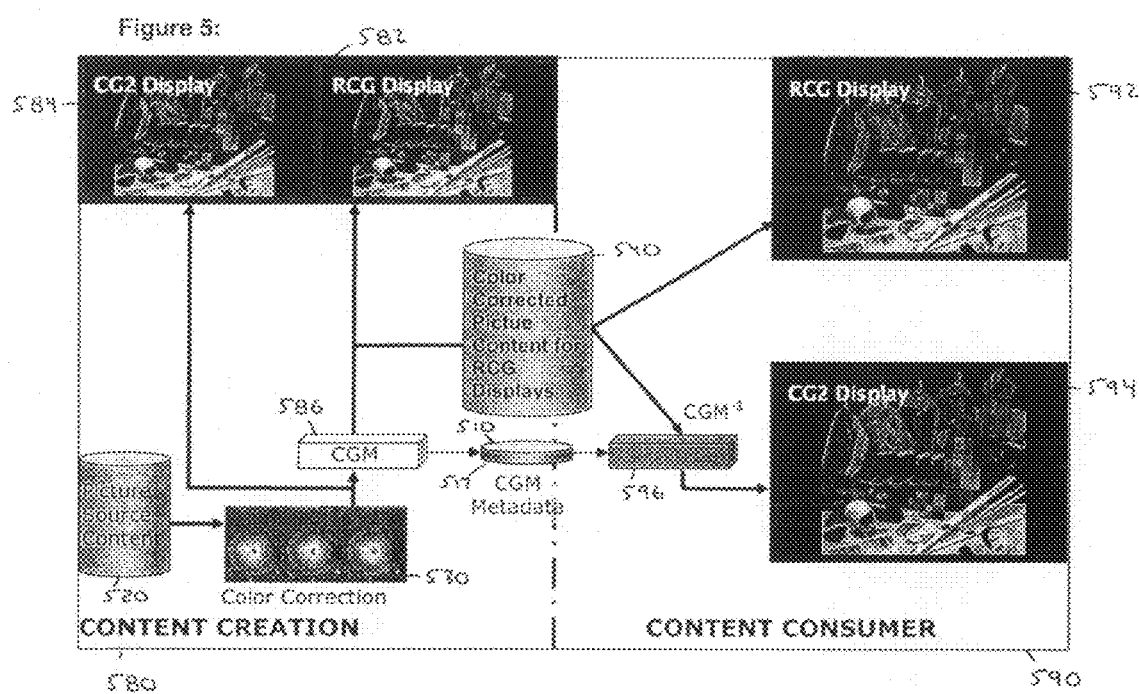
FIG. 5 is a high-level diagram showing the exemplary workflow for color correction to obtain a master for RCG displays and metadata for CG2 displays, in accordance with an embodiment of the present principles.

Turning to FIG. 5, a high-level diagram showing the exemplary workflow for color correction to obtain a master for RCG displays and metadata for CG2 displays is indicated generally by the reference numeral 500.

The color correction workflow 500 involves a content creation side 580 and a content consumer side 590. The color correction 530 is done based on a color gamut for CG2 displays. A CG2 display 584 shall be directly attached to the color correction tool. A CGM 586 is used to map the content from a color gamut for display on CG2 display 584 to a color gamut for display on RCG display 582, and the resultant picture content is then used for distribution/storage in color corrected picture content store 540. An RCG display 592 and a CG2 display 594 are used on the content consumer side 590.

In the embodiment, the use of the present principles provides a controlled color difference between the content displayed on the RCG display 592 and the CG2 display 594 on the content consumer side 590 as the distinctive feature. As noted above, the embodiment involves the use of a master, i.e., one version of mastered content, for (use by) RCG displays and metadata for (use by) CG2 displays.

The metadata 510 describes a transformation of picture source content into color corrected picture content. The picture source content is mastered for RCG displays but is color corrected for CG2 displays (thus using the CG2 to RCG GMM described above) and the color corrected picture content relates to colors for RCG displays. Thus, the metadata may describe, for example, the difference between the colors for a CG2 display and a RCG display. That is, the metadata may describe, for example, an inverse transform of the CGM 586 used for color correction, or, the metadata may describe the CGM 586 itself and the CGM block 596 has the processing capacity to invert the CGM description.

The picture source content may be stored, for example, in a picture source content store 520. The color corrected picture content may be stored, for example, in a color corrected picture content store 540. The metadata 510 may be stored, for example, in a metadata store 517.

A color correction module 530 generates the RCG master and the metadata for CG2 displays.

On the content creation side 580, the RCG mastered content, color corrected for CG2, is provided to the CGM module 586 that performs a CG2 to RCG GMM so that the RCG mastered content is color corrected for display on the RCG display 582.

On the content consumer side 590, the RCG mastered content, color corrected for CG2, is provided directly to the RCG display 592 without the use or need of the metadata or a color gamut mapping.

Moreover, on the content consumer side 590, the RCG mastered content, and the metadata for the CG2 displays is applied to a CGM module 596 that performs an inverse color gamut mapping (i.e., RCG to CG2 GMM) so that the RCG mastered content is transformed for display on the CG2 display 594. That is, by transmitting the inverse of the CG2 to RCG CGM (which will be a RCG to CG2 CGM) to the CG2 display 594, the CG2 display 594 is able to do the inverse of the CG2 to RCG CGM operation and retrieve the CG2 device colors.

Figure 6:
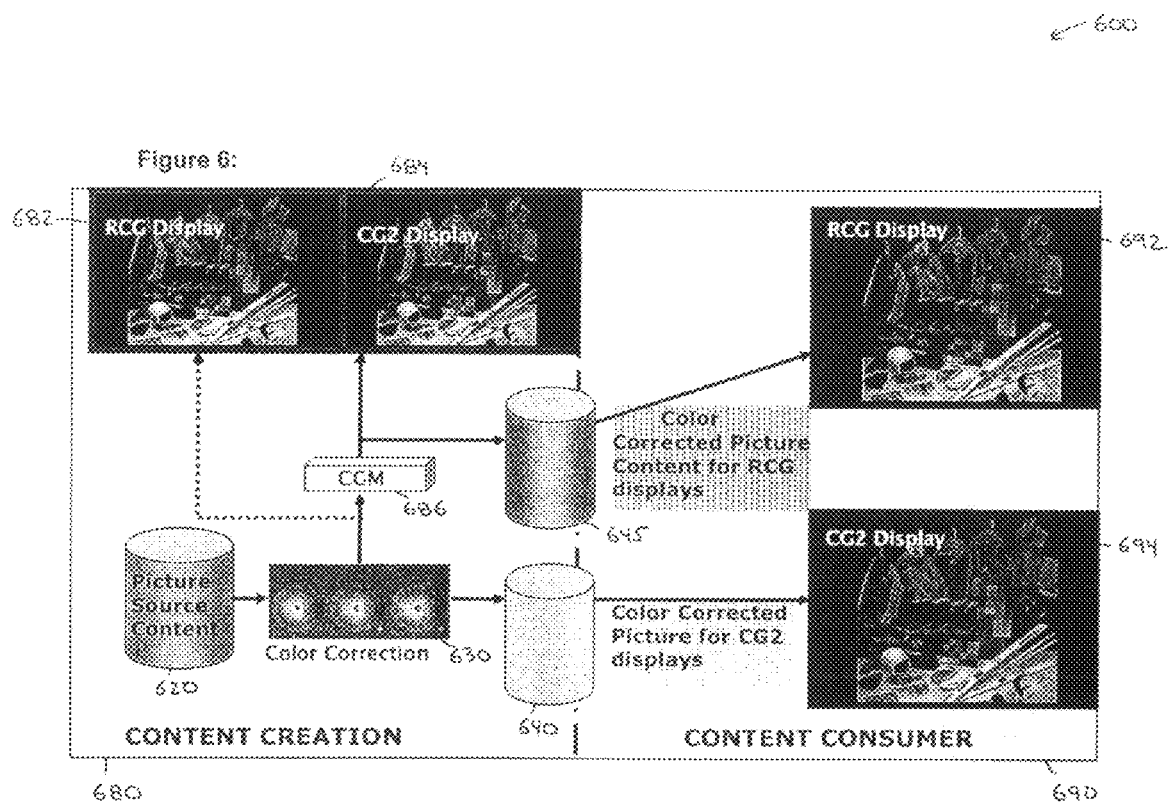
FIG. 6 is a high-level diagram showing the exemplary workflow for color correction to obtain a master for CG2 displays and one master for RCG displays, in accordance with an embodiment of the present principles.

Turning to FIG. 6, a high-level diagram showing the exemplary workflow for color correction to obtain a master for CG2 displays and one master for RCG displays is indicated generally by the reference numeral 600.

The color correction workflow 600 involves a content creation side 680 and a content consumer side 690. A RCG display 682 is used on the content creation side 680. In addition, a CG2 display 684 shall be used on the content creation side 580 for proof viewing the content meant for consumer RCG displays. A RCG display 692 and a CG2 display 694 are used on the content consumer side 690.

In an embodiment, the color correction will result in a master for CG2 displays (such as CG2 display 694), and a master for RCG displays (such as RCG display 692). In an embodiment, the master for the RCG displays would be a derivative of the master for CG2 displays. The approach of FIG. 6 provides a controlled color difference between a consumer CG2 display and a RCG display 590 as the distinctive feature. The quality of the color accuracy is subject to the CG2 specifications used for color correction matching those used in the field, or the display in the field being calibrated to the specification used for color correction.

The picture source content may be stored, for example, in a picture source content store 620. The color corrected picture content for RCG displays, i.e., the master for RCG displays, may be stored, for example, in a color corrected picture content store 645. The color corrected picture content for CG2 displays, i.e., the master for CG2 displays, may be stored, for example, in a color corrected picture content store 640.

On the content creation side, a color correction module 630 generates the CG2 master. Moreover, on the content creation side 680, the CG2 mastered content is applied to a CGM module 686 that performs a color gamut mapping to generate the RCG master, so that the CG2 mastered content is color corrected for display on the RCG display 682.

On the content consumer side 690, the RCG mastered content is provided directly to the RCG display 692 without the need for a color gamut mapping, and the CG2 mastered content is provided directly to the CG2 display 694 without the need for a color gamut mapping.

There is a singular specification for the RCG display, and yet multiple specifications will have to be considered for CG2 displays so, in an embodiment, it would be advantageous if the "mother" version was the version for RCG displays. In some circumstances, the color correction process may be a bit cumbersome since the colors are being modified with a non-linear mapping between the color correction and the reference display. Some colors may not change as initially expected by the colorist. However, there will be no colors in the master that cannot be displayed by a display with CG2, nor will there be a color that cannot be displayed by a RCG display. This is a real benefit of this approach.

Turning to FIG. 7, a high-level diagram showing the exemplary workflow for color correction to obtain a master for RCG displays and metadata for CG2 displays is indicated generally by the reference numeral 700.

The color correction workflow 700 involves a content creation side 780 and a content consumer side 790. A RCG display 782, using CG2 simulation via a CGM module 786, is used on the content creation side 780. Alternatively or in addition, a CG2 display may be used on the content creation side 780. A RCG display 792 and a CG2 display 794 are used on the content consumer side 790.

In the embodiment, the use of the present principles provides a controlled color difference between the content displayed on the RCG display 792 and the CG2 display 794 on the content consumer side 790. As noted above, the embodiment involves the use of a master, i.e., one version of mastered content, for (use by) RCG displays (when rendered using a CGM that simulates a CG2 display on a RCG display, i.e., a CG2 to RCG GMM is used) and metadata for (use by) CG2 displays.

The metadata 710 describes a transformation of picture source content into color corrected picture content. The picture source content is mastered for RCG displays but is color corrected for CG2 displays (thus using the CG2 to RCG GMM described above for rendering of the RCG mastered content on RCG displays) and the color corrected picture content relates to colors for RCG displays. Thus, the metadata may describe, for example, the difference between the colors for a CG2 display and a RCG display. That is, the metadata may describe, for example, an inverse transform of the CG2 simulation used for color correction, The picture source content may be stored, for example, in a picture source content store 720. The color corrected picture content may be stored, for example, in a color corrected picture content store 740. The metadata 710 may be stored, for example, in a metadata store 717.

A color correction module 730 generates the RCG master and the metadata for CG2 displays.

On the content creation side 780, the RCG mastered content, color corrected for CG2, is provided to the CGM module 786 that performs a CG2 to RCG GMM so that the RCG mastered content is color corrected for display on the RCG display 782.

On the content consumer side 790, the RCG mastered content, color corrected for CG2, is provided directly to the RCG display 792 without the use or need of the metadata or a color gamut mapping.

Moreover, on the content consumer side 790, the RCG mastered content, color corrected for CG2, and the metadata for the CG2 displays is applied to a CGM module 796 that performs an inverse color gamut mapping (i.e., RCG to CG2 GMM) so that the RCG mastered content is color corrected for display on the CG2 display 794. That is, by transmitting the inverse of the CG2 to RCG CGM (which will be a RCG to CG2 CGM) to the CG2 display 794, the CG2 display 794 is able to do the inverse of the CG2 to RCG CGM operation and retrieve the CG2 device colors.

Turning to FIG. 8, a high-level diagram showing the exemplary workflow for color correction to obtain a master for CG2 displays and one master for RCG displays is indicated generally by the reference numeral 800.

The color correction workflow 800 involves a content creation side 880 and a content consumer side 890. A RCG display 882 is used on the content creation side 880. A RCG display 892 and a CG2 display 894 are used on the content consumer side 890.

In an embodiment, the color correction will result in a master for CG2 displays (such as CG2 display 894), and a master for RCG displays (such as RCG display 892). In an embodiment, the master for the RCG displays would be a derivative of the master for CG2 displays. The approach of FIG. 8 provides a match between a consumer CG2 display and a RCG display. The quality of the match is subject to the CG2 specifications used for color correction matching those used in the field, or the display in the field being calibrated to the specification used for color correction.

The picture source content may be stored, for example, in a picture source content store 820. The color corrected picture content for RCG displays, i.e., the master for RCG displays, may be stored, for example, in a color corrected picture content store 845. The color corrected picture content for CG2 displays, i.e., the master for CG2 displays, may be stored, for example, in a color corrected picture content store 840.

On the content creation side, a color correction module 830 generates the CG2 master. Moreover, on the content creation side 880, the CG2 mastered content is applied to a CGM module 886 that performs a color gamut mapping to generate the RCG master, so that the CG2 mastered content is color corrected for display on the RCG display 882.

On the content consumer side 890, the RCG mastered content is provided directly to the RCG display 892 without the need for a color gamut mapping, and the CG2 mastered content is provided directly to the CG2 display 894 without the need for a color gamut mapping.

There is a singular specification for the RCG display, and yet multiple specifications will have to be considered for CG2 displays so, in an embodiment, it would be advantageous if the "mother" version was the version for RCG displays. In some circumstances, the color correction process may be a bit cumbersome since the colors are being modified with a non-linear mapping between the color correction and the reference display. Some colors may not change as initially expected by the colorist. However, there will be no colors in the master that cannot be displayed by a display with CG2, nor will there be a color that cannot be displayed by a RCG display. This is a real benefit of this approach.

On the content consumer side, circuitry will be provided that connects the signal source with a CG2 display. This circuitry can be implemented in hardware and/or in software, and provides the signal transform to generate the CG2 version needed out of the picture for RCG displays These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software.

Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. A method for color correcting, comprising:
    performing color correction on source picture content, using at least one of a non-reference type display having a non-reference color gamut and a reference type display having a reference color gamut,
    wherein said performing step comprises:
    mastering the source picture content to provide mastered color corrected picture content for display on the reference type displays having a reference color gamut; and
    generating metadata for a subsequent inverse color gamut mapping that color transforms the mastered color corrected picture content for display on non-reference type displays having a non-reference color gamut, wherein the metadata describes difference between colors of the non-reference type displays and the reference type displays; and
    wherein the subsequent inverse color gamut mapping is an inverse operation of a color gamut mapping applied during the color correction to obtain the mastered color corrected picture content for display on the reference type displays having the reference color gamut, and the source picture content is mastered only for the reference type displays having the reference color gamut.

2. The method of claim 1, wherein said step of mastering the source picture content comprises rendering the mastered color corrected picture content on the reference type display using a color gamut mapping that converts the source picture content for the non-reference type display to picture content for the reference type display.

3. The method of claim 1, further comprising transmitting a specification of the inverse color gamut mapping to at least one of the non-reference type displays for consumer consumption.

4. The method of claim 1, wherein the metadata is provided to the non-reference type displays for final consumption at least one of in-band and out-of-band with respect to the mastered color corrected picture content.

5. The method of claim 1, wherein the reference type displays and the non-reference type displays are at least one of liquid crystal displays, plasma displays, cathode ray tube displays, digital light processing displays, organic light emitting diode displays, liquid crystal on silicon displays, and direct drive image light amplifier displays.

6. A system for color correcting, comprising:
a color correction module for performing color correction on source picture content, using at least one of a non-reference type display having a non-reference color gamut and a reference type display having a reference color gamut, to provide mastered color corrected picture content for display on the reference type displays having a reference color gamut; and
a color gamut mapping module for performing a color gamut mapping with respect to the mastered color corrected picture content for display on the reference type displays having the reference color gamut to generate metadata for a subsequent inverse color gamut mapping with respect to the color gamut mapping, the subsequent inverse color gamut mapping color transforming the mastered color corrected picture content for display on non-reference type displays having a non-reference color gamut, wherein the metadata describes difference between colors of the non-reference type displays and the reference type displays; and
wherein the source picture content is mastered only for the reference type displays having the reference color gamut.

7. The system of claim 6, wherein the metadata is provided to the non-reference type displays for final consumption at least one of in-band and out-of-band with respect to the mastered color corrected picture content.

8. The system of claim 6, wherein the reference type displays and the non-reference type displays are at least one of liquid crystal displays, plasma displays, cathode ray tube displays, digital light processing displays, organic light emitting diode displays, liquid crystal on silicon displays, and direct drive image light amplifier displays.

9. A system for color correcting, comprising:
means for performing color correction on source picture content, using at least one of a non-reference type display having a non-reference color gamut and a reference type display having a reference color gamut,
wherein said means for performing color correction comprises:
means for mastering the source picture content to provide mastered color corrected picture content for display on the reference type displays having a reference color gamut; and
means for generating metadata for a subsequent inverse color gamut mapping that color transforms the mastered color corrected picture content for display on non-reference type displays having a non-reference color gamut, wherein the metadata describes difference between colors of the non-reference type displays and the reference type displays;
wherein the subsequent inverse color gamut mapping is an inverse operation of a color gamut mapping applied during the color correction to obtain the mastered color corrected picture content for display on the reference type displays having the reference color gamut, and the source picture content is mastered only for the reference type displays having the reference color gamut.

10. The system of claim 9, wherein said means for mastering the source picture content comprises means for rendering the mastered color corrected picture content on the reference type display using a color gamut mapping that converts the source picture content for the non-reference type display to picture content for the reference type display.

11. The system of claim 9, further comprising means for transmitting a specification of the inverse color gamut mapping to at least one of the non-reference type displays for consumer consumption.

12. The system of claim 9, wherein the metadata is provided to the non-reference type displays for final consumption at least one of in-band and out-of-band with respect to the mastered color corrected picture content.

13. The system of claim 9, wherein the reference type displays and the non-reference type displays are at least one of liquid crystal displays, plasma displays, cathode ray tube displays, digital light processing displays, organic light emitting diode displays, liquid crystal on silicon displays, and direct drive image light amplifier displays.

* * * * *